United States Patent [19]

Dall'Aglio

[11] Patent Number: 4,562,646
[45] Date of Patent: Jan. 7, 1986

[54] HEAD FOR CHECKING LINEAR DIMENSIONS

[75] Inventor: Carlo Dall'Aglio, Volta Reno di Argelato, Italy

[73] Assignee: Finike Italiana Marposs S.p.A., S. Marino di Bentivoglio, Italy

[21] Appl. No.: 664,166

[22] Filed: Oct. 24, 1984

[30] Foreign Application Priority Data

Nov. 21, 1983 [IT] Italy ................. 3625 A/83

[51] Int. Cl.⁴ .............................................. G01B 7/28
[52] U.S. Cl. ..................... 33/169 R; 33/559; 33/561
[58] Field of Search ............. 33/174 L, 174 R, 169 R, 33/172 E, 558, 551, 556, 559, 561

[56] References Cited

U.S. PATENT DOCUMENTS

| 4,279,080 | 7/1981 | Nakaya | 33/169 R |
| 4,288,925 | 9/1981 | McMurtry | 33/174 L |
| 4,447,958 | 5/1984 | Tanaka | 33/169 R |
| 4,477,976 | 10/1984 | Suzuki | 33/174 L |

FOREIGN PATENT DOCUMENTS

| 0068899 | 1/1983 | European Pat. Off. | |
| 2742817 | 4/1978 | Fed. Rep. of Germany | 33/174 L |
| 3234471 | 8/1983 | Fed. Rep. of Germany | 33/169 R |
| 2375580 | 7/1978 | France | |
| 2378259 | 8/1978 | France | |
| 2534682 | 4/1984 | France | |
| 2062234 | 5/1981 | United Kingdom | |
| 2121966 | 1/1984 | United Kingdom | |
| 968579 | 10/1982 | U.S.S.R. | 33/169 R |

Primary Examiner—Willis Little
Attorney, Agent, or Firm—Stevens, Davis, Miller & Mosher

[57] ABSTRACT

Head for checking linear dimensions of workpieces comprising a support, a movable arm carrying a feeler adapted to touch the workpiece to be checked and three members substantially perpendicular to a longitudinal geometric axis of the head. One of the members is fixed to the support, another member carries the arm and the third member is intermediate to the first two members. Arranged between adjacent members are two pairs of balls, which are aligned along paralllel axes, glued to one member and housed in conical recesses obtained in the other member, and which define two axes for mutual rotation between the adjacent members and are always maintained into contact with the surfaces of the relevant conical recesses by means of springs. An electrical circuit, closed in rest conditions, comprises two pairs of electrical contacts, which open the circuit as a consequence of displacements of the movable arm along opposite directions or as a consequence of an axial displacement of the movable arm.

20 Claims, 4 Drawing Figures

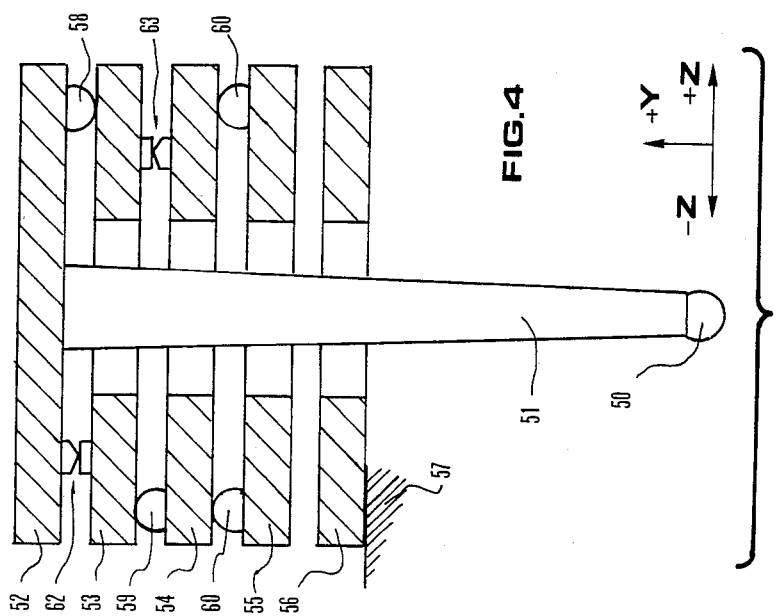
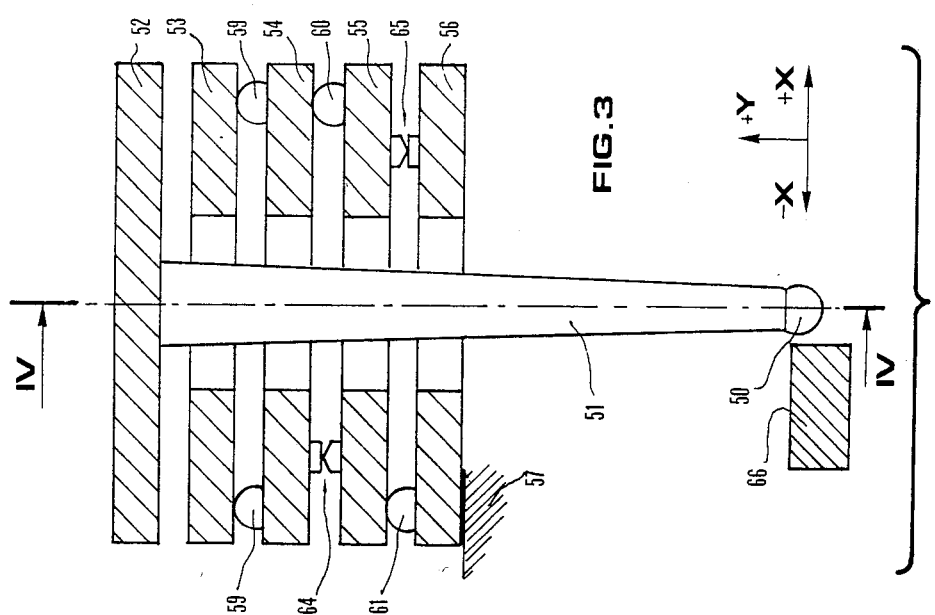

HEAD FOR CHECKING LINEAR DIMENSIONS

BACKGROUND OF THE INVENTION

1. Field of the Invention

The present invention relates to a head for checking linear dimensions, such as dimensions of workpieces, with a support; an arm—movable with respect to the support—, which defines a longitudinal geometric axis; a feeler arranged at an end of the movable arm; means, for connecting the arm to the support, comprising portions elongated mainly along directions perpendicular to said longitudinal axis, one of the portions being secured to the support and another being secured to the arm, and fulcrum means adapted to permit mutual displacements of the portions, the displacements essentially and only consisting of mutual rotations about at least one axis being transversal with respect to the longitudinal axis; thrust means for defining a rest position of the movable arm; and detecting means responsive to the displacements of the movable arm from the rest position.

2. Description of the Prior Art

As it is known, presently there is an increasing trend to provide turning machines and machining centers with heads for checking the linear dimensions of the workpieces, machined or to be machined, and of the tools. These heads normally comprise an arm carrying a feeler adapted to contact the workpiece and the tool, a support, devices for connecting the arm to the support—which permit displacements of the feeler along one or more axes—and detecting devices. The detecting devices can include position transducers, which provide measurement signals (normally of comparative type), or electrical contacts which open as a consequence of the mechanical contact between the feeler and the workpiece (or the tool). In the second case, the opening of the electrical contacts provides a logic signal which controls reading of measurement signals provided by transducers associated with the machine tool slide/s where there are arranged the head, and/or the workpiece, and/or the tool.

It is evident that sturdiness and repeatability are basic requirements for heads to be employed for the above-stated uses.

Moreover, the dimensions of the heads often must be small, due to problems of space for the particular type of connection and storage within the machine tool, particularly with regard to lathes provided with automatic systems for tool replacement.

Another important requirement for these heads is a rather broad amplitude of the displacements of the movable arm, in order to obtain measurement ranges of high value (as far as measuring heads are concerned) and/or for reasons of safety. Of course, if the overall dimensions of the head are very small, it becomes difficult to obtain long displacements of the movable arm while contemporaneously guaranteeing sturdiness and repeatibility of the head.

The known heads do not provide a satisfactory compromise between these contrasting requirements.

In fact, either the repeatability is impaired by excessive plays and consequent undesired motions among the electrical components, or the amplitude of the displacements is too limited due to the dimensions of the head itself.

Italian patent application No. 3578A/81 filed on Nov. 20, 1981 describes a measuring head in which the device connecting the arm to the support is obtained by means of an integral member having portions with reduced thickness, which define the fulcrums about which the movable arm can perform rotational displacements. However, just in view of the type of their construction, these fulcrums permit angular movements of small amplitude, so that, in order to obtain measurement ranges of broad value, it is necessary to foresee considerable dimensions for the integral member and thus for the head.

SUMMARY OF THE INVENTION

Object of the present invention is to build a head which, by involving transcurable plays, guarantees high repeatability and/or accuracy and has small dimensions, while permitting displacements of the movable arm of considerable amplitude.

This and other objects, which will become evident from the following description, are reached by a head of the type set forth wherein, according to the invention, said portions are defined by relevant, distinct members, the fulcrum means comprise elements arranged between the members for defining the rotation axis, the rotation axis being offset with respect to the longitudinal axis and the thrust means comprise thrust elements for applying to the elements of the fulcrum means and to the members forces such as to guarantee the occurrence of displacements as mutual rotations only.

BRIEF DESCRIPTION OF THE DRAWINGS

The invention will be described in detail with reference to preferred embodiments, to be considered as exemplifying and non limiting, illustrated in the annexed drawings, wherein:

FIG. 3 is a longitudinal section showing the main components of another contact-detecting head having an arm movable with more degrees of freedom with respect to the arm of the head of the preceding figures; and FIG. 4 is a longitudinal section of the head of FIG. 3, according to path IV—IV of FIG. 3.

DETAILED DESCRIPTION

Figure 1:
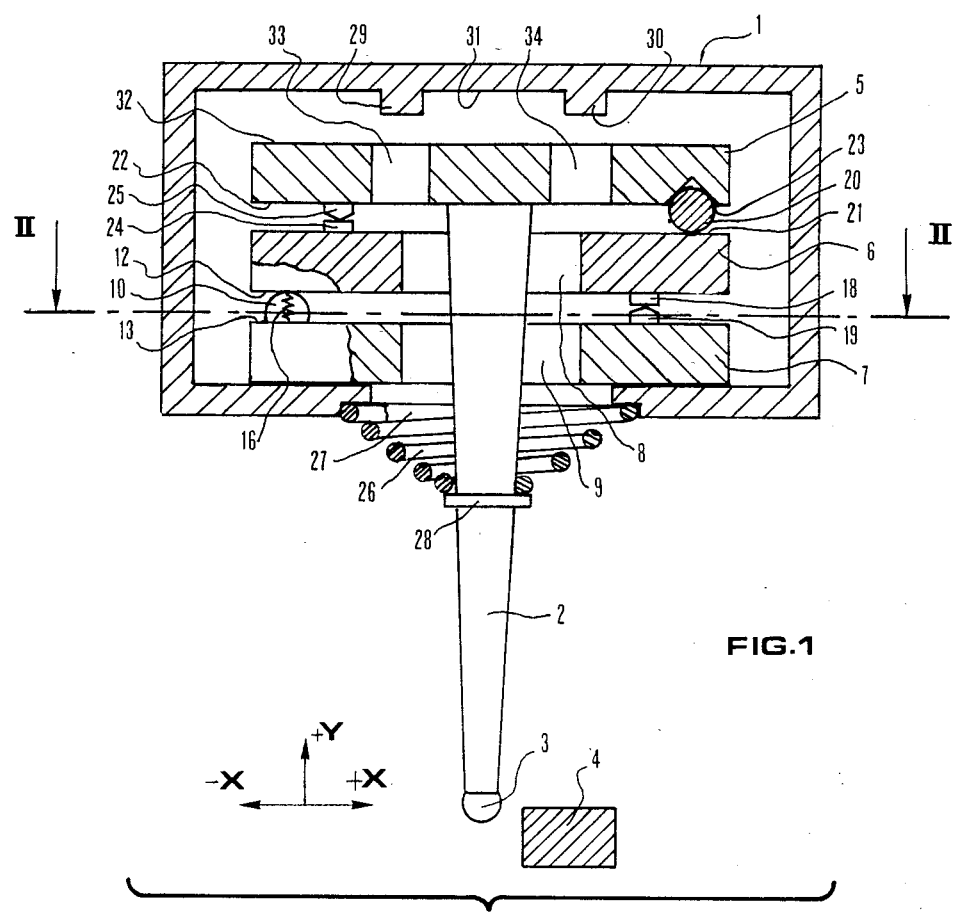
FIG. 1 is a longitudinal section of a contact-detecting head shown in the rest position, with some details shown in front view.
Figure 2:
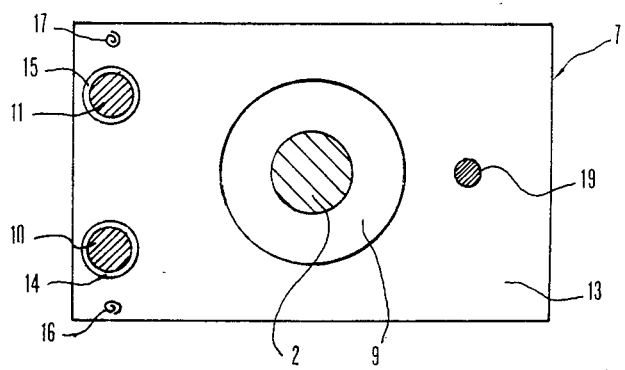
FIG. 2 is a cross-section of the arm-set of the same head, according to path II—II of FIG. 1.

The arm-set of the head illustrated in FIGS. 1 and 2 is secured to a support or envelope 1 and comprises a movable arm 2 defining a longitudinal geometric axis which, in rest conditions, coincides with the longitudinal geometric axis of support 1 and of the head. Fixed at an end of arm 2 is a feeler 3 which can contact a part 4 as a consequence of displacements mutually approaching part 4 of the head.

Arm 2 is connected to envelope 1 by connection means, which comprise three portions, i.e. three distinct members or plates 5, 6 and 7 arranged (in rest position) substantially one over the other and elongated mainly along directions perpendicular to the longitudinal axis of the head.

Members 5 and 7 are directly secured (in a way not shown in the figure) to arm 2 and envelope 1, respectively, while member 6 is arranged in an intermediate position.

Members 6 and 7 have through holes 8, 9 for the passage of arm 2 with sufficient play to permit lateral displacements, of a determined amplitude, of the arm within the holes.

The connection means also comprise fulcrum means including two distinct elements or balls 10 and 11 arranged intermediate with respect to members 6 and 7. In particular, these balls 10 and 11 are fixed (e.g. glued) to the surface 12 of member 6 and slidably cooperate with the surface of conical seats, respectively 14 and 15, obtained in the surface 13 of member 7.

Thrust means comprising two return springs 16 and 17, arranged between surfaces 12 and 13, keep balls 10 and 11 permanently into contact with conical seats 14 and 15, in both rest and working conditions, thus maintaining members 6 and 7 connected to each other.

The head comprises detecting means having two electrical contacts 18 and 19, respectively fixed to surface 12 and surface 13, which—in rest conditions—are closed against each other. Contacts 18 and 19 are arranged at a side (the right side in FIGS. 1 and 2) of the longitudinal axis of the head opposite to the side (the left side in FIGS. 1 and 2) where are arranged balls 10 and 11.

The two balls 10 and 11, the centers of which are aligned along a transverse axis perpendicular to the longitudinal axis of the head, act as abutments determining, together with the pair of contacts 18, 19, a mutual position of members 6 and 7. Moreover, the movement of balls 10 and 11 within conical seats 14 and 15 permits a mutual rotation of members 6 and 7 about the above mentioned transverse axis defined by the centers of the balls.

The fulcrum means comprise a second pair of balls 20—only one of which is visible in FIG. 1—arranged intermediate with respect to members 5 and 6, at the right side with respect to the longitudinal axis of the head.

In particular, these balls 20 are fixed (e.g. glued) to surface 21 of member 6 and are slidably housed within relevant conical recesses 23—only one of which is visible in FIG. 1—obtained in the surface 22 of member 5.

A second pair of return springs, not visible in FIGS. 1 and 2, has function similar to that of springs 16 and 17, by keeping the second pair of balls 20 permanently into contact with member 5.

Two electrical contacts 24 and 25 are respectively fixed upon surface 21 and surface 22, at the left side with respect to the longitudinal axis of the head, and in rest conditions are closed against each other.

The centers of the second pair of balls 20 are aligned along a transverse axis, which is perpendicular to the axis of arm 2 and, moreover, is parallel to the transverse axis defined by the centers of balls 10 and 11. Electrical contacts 24 and 25 are arranged, with respect to the longitudinal axis of the head, at the opposite side of the transverse axis defined by balls 20.

In rest conditions, the two transverse axes and, respectively, contacts 18, 19 and 24, 25 are equally and oppositely spaced from the geometric axis of arm 2, i.e. from the longitudinal axis of the head.

The function of the second pair of balls 20 is quite similar to that of balls 10 and 11, by defining, together with contacts 24, 25, a mutual position of members 5 and 6 and permitting movements of mutual rotation between members 5, 6 about the above mentioned transverse axis through the cooperation between spherical surfaces, conical seats and springs.

Thrust means consisting of a compression spring 26, by cooperating with a circular seat 27 obtained in support 1 and with a circular shoulder 28 obtained in arm 2, define the rest position of movable arm 2 and determine the values of the contact force between feeler 3 and part 4, i.e. the force necessary for causing mutual displacements, particularly rotations, between members 5, 6 and 7.

A limiting device comprises two stops 29 and 30, of substantially cylindrical shape, which are fixed to the internal surface 31 of support 1 and are adapted to cooperate with the stop or reference surface 32 of member 5 for limiting the rotative movements of member 5 and thus of arm 2 secured to the same.

Two cylindrical seats 33 and 34 obtained in member 5, are adapted to house stops 29 and 30 when, due to axial thrusts against feeler 3, member 5 performs a displacement of axial translation, resulting from mutual opposite rotations between members 5, 6 and 6, 7 about the relevant fulcrums defined by balls 20, 10 and 11.

The operation of the head is as follows.

The head is approached to part 4 (or vice-versa) and after the contact of the part against feeler 3, due to the continuation of the mutual displacement, the feeler is subjected to a force, e.g. along the direction indicated in the figure by the arrow marked −X.

This force is transmitted, through arm 2, to the arm-set of the head and, if it is capable of overcoming the counteracting force applied by spring 26, member 5—secured to arm 2—rotates about the transverse axis defined by the second pair of balls 20.

In fact, springs 16 and 17 are built so as to apply a resistance larger than that applied by spring 26, thus permitting member 6 to remain as integral with member 7, and thus with envelope 1, also in view of the operation of contacts 18 and 19, which are urged against each other.

The mutual rotation of members 5 and 6 causes opening of contacts 24 and 25, thus providing a logic signal indicating the occurrence of the displacement of feeler 3 along direction −X.

When feeler 3 is urged along direction +X (for example, due to the contact against a part, arranged symmetrically with respect to part 4, about the axis of arm 2), if the force is sufficient to compress spring 26, the combined action of the second pair of return springs arranged between surfaces 21 and 22, and of the mating between contacts 24 and 25 keeps stationary the mutual position of members 5 and 6 and causes rotation of these members about the transverse axis defined by the centers of balls 10 and 11, integrally with arm 2. This rotation gives rise to the opening of contacts 18 and 19, providing a logic signal which detects the displacement of feeler 3 along direction +X.

It must be considered that mention has been made of displacements of feeler 3 along rectilinear directions, instead of rotations, but, since the displacements have a substantially small amplitude, it is admissible to consider that, in practice, these displacements are substantially rectilinear.

The head structure permits feeler 3 to displace along the direction indicated by the arrow marked +Y, too. In fact, by urging the feeler along this direction, one obtains a translation of feeler 3 and arm 2 resulting from the combination of the opposed rotatory motions about the two transverse axes defined by the pairs of balls 10, 11 and 20.

This motion causes the opening of two switches constituted by the two pairs of electrical contacts 18, 19 and 24, 25. As a matter of fact, since contacts 18, 19 and 24, 25 are arranged in a series circuit connected to a logic unit, the opening of either of the pairs detects the displacement of feeler 3. The series circuit and the logic unit are not illustrated in the figures because they are per se known.

The particular structure of the above described limiting device provides considerable advantages. First of all, if the limitation of the lateral displacements of arm 2 were obtained by the contact of arm 2 against the surface of hole 9, this contact might give rise to stresses dangerous for the integrity and accuracy of the fulcrums defined by balls 10, 11 and 20. The contact of member 5 against stops 29, 30 overcomes this danger, at least for normal values of the force applied to feeler 3.

Moreover, it must be considered that, while displacements of feeler 3 along direction +Y give rise to axial translations of member 5 having the same amplitude, displacements of the same feeler 3 along direction +X (or −X) give rise (for a head comprised of elements having dimensions proportional to those of FIG. 1) to components of axial translation of the points of surface 32 of member 5, having a smaller amplitude. This means that, if seats 33, 34 were not provided, the amplitude of the stroke of feeler 3 determined by the distance between stops 29, 30 and surface 32, would be smaller along direction +Y than along direction +X (or −X). Therefore, seats 33 and 34 are provided for avoiding that. In this way, the travel of feeler 3, as far as axial translations are concerned, is limited by the contact between surface 32 and the internal surface 31 of envelope 1.

A head according to the invention can be built by using a different number of members similar to members 5, 6 and 7 of FIG. 1, or members having shape and/or outline slightly different.

In particular, it is possible to build heads having two members only (and thus only one pair of balls arranged between the members) which provide for displacements of the feeler along one half axis only.

It is also possible to build heads having five members, such as a head having the arm-set schematically shown in FIGS. 3 and 4, with a structure permitting displacements of a feeler 50—fixed to a movable arm 51—along two and a half axes, in particular along the directions indicated in the figures by +X, −X, +Z, −Z, +Y.

The five members or plates 52 (whereto is fixed arm 51), 53, 54, 55 and 56 (the latter is fixed to a support schematically indicated by reference sign 57), similar to members 5, 6 and 7 of FIG. 1, are arranged opposite one another in substantially parallel positions (in rest condition); pairs of balls 58, 59, 60 and 61 are arranged intermediate, glued to a member and free to rotate within conical seats obtained in the adjacent member; pairs of contacts 62, 63, 64 and 65, connected in a series circuit, are closed (in rest condition) between the same members. Return springs (not shown in the figure) keep balls 58-61 in contact with the two members between which they are located.

The pairs of balls 58 and 59 provide fulcrum means adapted to define two fulcrums for mutual rotation of members 52, 53 and 53, 54 about axes parallel to direction ±X and equally spaced from the head longitudinal axis. Similarly, the pairs of balls 60 and 61 define two fulcrums for mutual rotation of members 54, 55 and 55, 56 about axes parallel to direction ±Z and equally spaced from the head longitudinal axis.

Moreover, the head of FIGS. 3 and 4 comprises elements similar or equivalent to corresponding elements shown in FIGS. 1 and 2, e.g. a spring corresponding to spring 26, suitable stop means and seats (such as an annular stop or several stops fixed to casing 57, an annular groove obtained in member 52 and a suitable stop surface of casing 57) corresponding to stops 29 and 30, seats 33 and 34 and surface 31.

The operation is quite similar to that of the head of FIG. 1. For better clarity, the operation of the arm-set with regard to displacements of feeler 50 along directions +X and +Y is described.

When feeler 50 contacts part 66 as shown in FIG. 3, feeler 50 is subjected to a force along the +X direction. Due to the mutual contact between the pair of balls 58, 59 and 60, arranged between the members, and the pairs of contacts 62, 63 and 64, the four members 52, 53, 54 and 55 and arm 51 integrally rotate, with respect to member 56, about a transverse axis defined by the pair of balls 61, causing opening of the pair of contacts 65 arranged between members 55 and 56. This opening provides a logic signal which detects the displacement of feeler 50 along the +X direction.

When feeler 50 moves along the +Y direction, member 52, integral with arm 51, performs a translation resulting from the combination of the following mutual rotations: between members 52 and 53 about balls 58; between members 53 and 54 about balls 59; between members 54 and 55 about balls 60 and between members 55 and 56 about balls 61.

This displacement causes opening of the different pairs of electrical contacts and, since they are arranged in a series circuit connected to a logic unit—not shown in the figures—, the opening of any one of the pairs of contacts detects the motion of feeler 50 along the +Y direction.

It is remarked that the position of the ball pairs between the members, whichever the number of members may be, is defined, during the manufacturing phase, by the position of the conical seats, i.e. by machining operations carried out on only one of the two members to be coupled. In fact, the gluing to the other member is carried out in the assembling phase, after having stacked the different members and inserted the balls into the relevant seats. It is evident that this makes things easier, by rendering unnecessary to seek difficult correspondences between positions of different members.

Moreover, still with regard to the pairs of balls arranged between the members, it is remarked that they have mechanical functions only, merely acting as stops and fulcrums, while the electrical detection is performed by other elements (in particular, in the embodiment referred to in FIG. 1, by the pairs of contacts 18, 19 and 24, 25). Consequently, these balls are manufactured by using mechanically suitable materials (having, in particular, a low coefficient of friction and a high resistance to wear) independently from their electrical features.

All of the above described heads are of contact-detecting type; however, it is evident that instead of the electrical contacts it is possible to use corresponding elements of position transducers, thus permitting to manufacturing measuring heads.

It is also possible to obtain the fulcrums in different ways, for example by using roller or ball bearings, with two rings fixed to relevant adjacent members and with devices adapted to pre-load the bearing, in order to eliminate possible plays.

According to another possible modification of the fulcrum means, the balls of each ball pair are welded to the relevant member and the relevant seats are shaped, respectively, as a conical seat and a Vee seat.

It is evident, too, that the described heads may undergo further changes and variants equivalent from a functional or constructional point of view, without departing from the scope of the invention.

What is claimed is:

1. A head for checking linear dimensions, such as dimensions of workpieces, comprising a support; an arm movable with respect to the support; a feeler arranged at an end of the movable arm; connective means, for connecting the arm to the support, including members arranged substantially one over the other along a longitudinal geometric axis, the members being elongated mainly along directions perpendicular to said longitudinal axis, one of the members being secured to the support and another being secured to the arm, and fulcrum means for permitting mutual displacements of the members; thrust means for defining a rest position of the movable arm; and detecting means distinct from said fulcrum means and responsive to the displacements of the movable arm from the rest position, wherein said fulcrum means comprise elements arranged between the members and having surfaces slidably cooperating for permitting the mutual displacements of the members, said elements defining at least one rotation axis which is transversal and offset with respect to the longitudinal geometric axis, and the thrust means comprise thrust elements for applying to the elements of the fulcrum means and to the members forces adapted to keep into contact said slidably cooperating surfaces, both in said rest position and during said displacements, for guaranteeing the occurrence of said mutual displacements of the members as mutual rotations only.

2. The head according to claim 1, wherein the detecting means comprise at least two separate elements associated with relevant ones of said members.

3. The head according to claim 2, wherein said detecting means comprise at least a switch with electrical contacts closed in rest position, each of said separate elements defining a relevant electrical contact.

4. The head according to claim 1, wherein said thrust elements comprise resilient elements.

5. The head according to claim 4, wherein said elements of the fulcrum means have substantially spherical shapes.

6. The head according to claim 1, wherein said thrust means comprise a resilient device cooperating with the arm and the support and permitting said displacements.

7. A head for checking linear dimensions, such as dimensions of workpieces comprising a support; an arm movable with respect to the support; a feeler arranged at an end of the movable arm; connective means, for connecting the arm to the support, including members arranged substantially one over the other along a longitudinal geometric axis, the members being elongated mainly over directions perpendicular to said longitudinal axis, one of the members being secured to the support and another being secured to the arm, and fulcrum means for permitting mutual displacements of the members; thrust means for defining a rest position of the movable arm; and detecting means responsive to the displacements of the movable arm from the rest position, wherein said fulcrum means comprise elements arranged between the members for defining at least one rotation axis, the rotation axis being tranversal and offset with respect to the longitudinal geometric axis, the thrust means comprise thrust elements for applying to the elements of the fulcrum means and to the members forces such as to guarantee the occurrence of said mutual displacements of the members as mutual rotations only, said thrust elements comprising resilient elements for keeping said elements of the fulcrum means into contact with the members, both in said rest position and during said displacements, and wherein said elements of the fulcrum means have substantially spherical shapes and at least one of said members defines at least one seat having substantially conical shape, for cooperating with a relevant element of the fulcrum means.

8. The head according to claim 7, wherein said elements of the fulcrum means are fixed to one of the members between which they are arranged.

9. A head for checking linear dimensions, such as dimensions of workpieces, comprising a support; an arm movable with respect to the support; a feeler arranged at an end of the movable arm; connective means, for connecting the arm to the support, including members arranged substantially one over the other along a longitudinal geometric axis, the members being elongated mainly along directions perpendicular to said longitudinal axis, one of the members being secured to the support and another being secured to the arm, and fulcrum means for permitting mutual displacements of the members; thrust means for defining a rest position of the movable arm; and detecting means responsive to the displacements of the movable arm from the rest position and comprising at least two separate elements associated with relevant ones of said members, wherein said fulcrum means comprise elements arranged between the members for defining at least one rotation axis, the rotation axis being transversal and offset with respect to the longitudinal geometric axis, said detecting means comprise at least a switch with electrical contacts closed in rest position, each of said separate elements defining a relevant electrical contact, the elements of the fulcrum means arranged between two of said members being located at a side with respect to said longitudinal geometric axis and two of said electrical contacts being coupled to said two members and arranged at the opposed side with respect to said longitudinal geometric axis, and the thrust means comprise thrust elements for applying to the elements of the fulcrum means and to the members forces such as to guarantee the occurrence of said mutual displacements of the members as mutual rotations only.

10. A head for checking linear dimensions, such as dimensions of workpieces, comprising a support; an arm movable with respect to the support; a feeler arranged at an end of the movable arm; connective means, for connecting the arm to the support, including members arranged substantially one over the other along a longitudinal geometric axis, the members being elongated mainly along directions perpendicular to said longitudinal axis, one of the members being secured to the support and another being secured to the arm, and fulcrum means for permitting mutual displacements of the members; thrust means for defining a rest position of the movable arm; detecting means responsive to the displacements of the movable arm from the rest position; and a limiting device having stops associated with the support and with the member secured to the arm, for limiting the displacements of the arm with respect to the support; wherein said fulcrum means comprise elements arranged between the members for defining at least one rotation axis, the rotation axis being transversal and offset with respect to the longitudinal geometric axis, and the thrust means comprise thrust elements for applying to the elements of the fulcrum means and to the members forces such as to guarantee the occurrence of said mutual displacements of the members as mutual rotations only.

11. A head for checking linear dimensions, such as dimensions of workpieces, comprising a support; an arm movable with respect to the support; a feeler arranged at an end of the movable arm; connective means, for connecting the arm to the support, including three members arranged substantially one over the other along a longitudinal geometric axis, the members being elongated mainly along directions perpendicular to said longitudinal axis, one of the members being secured to the support and another being secured to the arm, and fulcrum means for permitting mutual rotations of the members about two transverse axes, said transverse axes being—in rest condition of the movable arm—perpendicular to and equally spaced from said longitudinal axis; thrust means for defining a rest position of the movable arm; and detecting means comprising four separate elements, associated two by two to relevant ones of said members, for detecting axial displacements of said feeler and displacements of the feeler along two opposite transverse directions, wherein said fulcrum means comprise elements arranged between the members for defining said two transverse axes, and the thrust means comprise thrust elements for applying to the elements of the fulcrum means and to the members forces such as to guarantee the occurrence of mutual displacements of the members as mutual rotations only.

12. The head according to claim 11, wherein two of said members have openings for the passage of the movable arm.

13. The head according to claim 11, further comprising a limiting device having a plurality of stop surfaces coupled to the support and to the member secured to the movable arm for selectively cooperating with one another for limiting, respectively, said axial displacements and displacements along transverse directions.

14. A head for checking linear dimensions, such as dimensions of workpieces, comprising a support; and arm movable with respect to the support; a feeler arranged at an end of the movable arm; connective means, for connecting the arm to the support, including five members arranged substantially one over the other along a longitudinal geometric axis, the members being elongated mainly along directions perpendicular to said longitudinal axis, one of the members being secured to the support and another being secured to the arm, and fulcrum means for permitting mutual rotations about four transverse axes, said transverse axes being—in rest condition of the movable arm—equally spaced from said longitudinal axis and two by two parallel and two by two perpendicular to one another; thrust means for defining a rest position of the movable arm; and detecting means comprising eight separate elements, associated two by two to relevant ones of said members, for detecting axial displacements of said feeler, as well as displacements of the feeler along any transverse direction, wherein said fulcrum means comprise elements arranged between the members for defining said four transverse axes, and the thrust means comprise thrust elements for applying to the elements of the fulcrum means and to the members forces such as to guarantee the occurrence of said mutual displacements of the members as mutual rotations only.

15. The head according to claim 14, wherein at least four of said members have through holes for the passage of the movable arm.

16. A contact detecting head, comprising:
a casing;
three distinct members including, respectively, a first plate fixed to the casing, a second plate facing the first plate and a third plate facing the second plate, the three plates being arranged, in rest position, substantially perpendicular to a longitudinal geometric axis;
an arm coupled to the third plate and having at an end a feeler for contacting a part to be checked;
first and second fulcrum means arranged, respectively, between the first and the second plate and between the second and the third plate for defining two parallel axes of mutual rotation of the relevant plates, these parallel axes being arranged at opposite sides of and perpendicular to said longitudinal geometric axis;
switch means including a first electrical switch arranged between the first and the second plate, at a side of the longitudinal geometric axis opposite to that where is arranged the axis of mutual rotation defined by the first fulcrum means, and a second electrical switch arranged between the second and the third plate, at a side of the longitudinal geometric axis opposite to that where is arranged the axis of mutual rotation defined by the second fulcrum means; and
resilient means for defining said rest position of the plates.

17. The contact detecting head according to claim 16, wherein each of the first and second fulcrum means comprises a pair of elements fixed to one plate and slidably cooperating with the other plate and the resilient means comprise spring means for maintaining the elements in contact with the relevant other plate.

18. A contact detecting head comprising:
a support;
five distinct plates substantially arranged one over the other along a longitudinal direction, one end plate being fixed to said support;
an arm fixed the other end plate, the arm having a feeler for contacting a part to be checked;
first, second, third and fourth fulcrum means including elements arranged between each pair of adjacent plates, these elements being fixed to one plate and slidable on the other plate, the fulcrum means defining four axes of mutual rotation of the plates, these axes of rotation being two by two parallel and two by two perpendicular and being offset with respect to the longitudinal geometric axis;
first, second, third and fourth switch means including relevant pairs of electrical contacts arranged between each pair of adjacent plates; and
resilient means coupled to said plates for maintaining said elements in contact with the relevant said other plate.

19. The head according to claim 18, wherein said arm is elongated along a direction perpendicular to the end plate where the arm is fixed and the other plates have through holes for the passage of the arm.

20. A head for checking linear dimensions, such as dimensions of workpieces, comprising a support; an arm movable with respect to the support; a feeler arranged at an end of the movable arm; connective means, for connecting the arm to the support, including a first member secured to the support, a second member secured to the arm and at least an intermediate member arranged substantially between said first and second members, the members being arranged along a longitudinal geometric axis and being one over the other along a longitudinal geometric axis and being elongated mainly along directions perpendicular to said longitudinal axis, and fulcrum means for permitting mutual displacements of the members; thrust means for defining a rest position of the movable arm; and detecting means distinct from said fulcrum means and responsive to the displacements of the movable arm from the rest position, wherein said fulcrum means comprise elements arranged between the members for defining at least two rotation axes, the rotation axes being perpendicular to and equally spaced from said longitudinal axis, and the thrust means comprise thrust elements for applying to the elements of the fulcrum means and to the members forces adapted to keep the elements of the fulcrum means into contact with relevant members, both in said rest position and during said displacements, for guaranteeing the occurrence of said mutual displacements of the members as mutual rotations only.

* * * * *

UNITED STATES PATENT AND TRADEMARK OFFICE
CERTIFICATE OF CORRECTION

PATENT NO. : 4,562,646

DATED : January 7, 1986

INVENTOR(S) : Carlo DALL'AGLIO

It is certified that error appears in the above-identified patent and that said Letters Patent is hereby corrected as shown below:

Title Page, [56] References Cited, under U.S. PATENT DOCUMENTS, --4,441,257  4/1984  GOLINELLI et al  33/174L-- should be included.

Title Page, [56] References Cited, under FOREIGN PATENT DOCUMENTS --3578A/81  11/1981  Italy-- should be included.

Column 2, line 58, "part 4 of the head" should read --part 4 and the head--.

Column 6, line 64, "to" should be cancelled.

Column 7, line 61, "over" should be --along--.

Column 9, line 46, "and" should be --an--.

Column 11, lines 8-9, "one over the other along a longitudinal geometric axis and being" should be cancelled.

Signed and Sealed this

Fifth Day of August 1986

[SEAL]

Attest:

DONALD J. QUIGG

Attesting Officer

Commissioner of Patents and Trademarks